United States Patent [19]

Graham et al.

[11] Patent Number: 4,554,743

[45] Date of Patent: Nov. 26, 1985

[54] UNIVERSAL HEAD PROTRUSION GAUGE FOR VIDEO RECORDERS

[75] Inventors: Wayne B. Graham, San Jose; John Bonn, Saratoga, both of Calif.

[73] Assignee: Tentel Corporation, Calif.

[21] Appl. No.: 595,139

[22] Filed: Mar. 30, 1984

Related U.S. Application Data

[63] Continuation-in-part of Ser. No. 480,515, Mar. 30, 1983, abandoned.

[51] Int. Cl.$^4$ .................................................. G01B 3/22
[52] U.S. Cl. .................................... 33/172 R; 33/169 R
[58] Field of Search ............ 33/172 R, 172 B, 169 R, 33/149 E, 149 F, 149 G, 149 D; 369/55

[56] References Cited

U.S. PATENT DOCUMENTS

| | | | |
|---|---|---|---|
| 635,088 | 10/1899 | Bowker | 33/149 F |
| 1,390,432 | 9/1921 | Douglass | 33/172 R |
| 2,066,699 | 1/1937 | Skelton | 33/172 R |

*Primary Examiner*—Charles Frankfort
*Assistant Examiner*—Patrick R. Scanlon
*Attorney, Agent, or Firm*—Ronald E. Grubman; Joseph H. Smith

[57] ABSTRACT

A gauge for use in measuring the protrusion of a head from the surface of a video recorder is disclosed. The gauge is a universal gauge which can accurately and reproducibly measure head protrusion on any video recorder without the need of precision aligned mounting holes. The necessary accuracy is achieved by a unique double pivot design along with a universal mounting scheme. A novel mechanism is also provided to aid in visual alignment of the gauge and to provide a positive indication of misalignment by the user.

13 Claims, 7 Drawing Figures

UNIVERSAL HEAD PROTRUSION GAUGE FOR VIDEO RECORDERS

CROSS REFERENCE TO RELATED APPLICATION

This is a continuation-in-part of application Ser. No. 480,515, filed Mar. 30, 1983, now abandoned.

BACKGROUND

Video recorders have become useful in a wide range of commercial and entertainment fields. A key component in such recorders is one or more video "heads", which are used to record or playback information on an appropriate recording medium.

The head itself is a delicate mechanism which protrudes through a surrounding drum surface usually no more than 0.003 inch. As the recorder is used the head gradually wears down, until eventually the head must be replaced. By measuring the amount of head protrusion from its surrounding surface, the amount of remaining head life can be estimated, and it is possible to inexpensively predict the optimum point at which the head should be replaced without having to wait for a total wearout failure.

Presently the manufacturers of some brands and models of video recorders provide a unique means for measuring this head protrusion and wear. For each of these the manufacturer knows precisely where the head is positioned relative to the video recorder frame and provides a series of precision mounting holes for a uniquely designed head protrusion gauge. Since the relative position of the head is known precisely the head protrusion gauge need only be a simple, single point indicator mounted on a unique mounting stand.

Unfortunately for the service technician who is interested in servicing more than one brand of video recorder, each manufacturer's head protrusion gauge is unique and cannot generally be used to measure head wear on other video recorders due to the physical incompatibility. If an attempt is made to make use of such an incompatible gauge the likely result is not only an inaccurate measurement which thus either over or under estimates head wear, but also the possible total destruction of the delicate head requiring an expensive and possibly unnecessary replacement.

SUMMARY OF THE INVENTION

The present invention provides a unique head protrusion gauge which can be used on virtually any video recorder. With this single universal gauge it is possible to measure head wear for any brand of video recorder with very high accuracy, and at least as accurately in most cases as with the individual non-universal gauges provided by some manufacturers.

Such a universal gauge is possible due to a novel double pivot design which does not require the position of the gauge to be exactly known in order to yield a precise measurement. Instead, it is only necessary to first rotate the drum so that the head is not in the way; place a leveling block which is mounted on a free pivot with a limited range of motion flat against the surface of the drum so that the reading of the dial indicator can be noted for later base scale subtraction; rotate the drum to bring the head within a target zone about the center of rotation of the free pivot of the leveling block; and to allow the leveling block to rotate on this free pivot and push against a measuring stem, which in turn pivots about a separate pivot so as to cause a pointer on a dial indicator to rotate an amount proportional to the head protrusion.

Although the video head is much stronger in the radial direction (i.e. toward the center of the video drum) rather than in the vertical direction relative to the drum, the head is nonetheless still quite fragile. Therefore, the only force in the present universal gauge which is exerted against the head is in the relatively strong radial direction, and is provided by the spring return force of the dial indicator, thus minimizing the possibility of damaging the head.

To insure that the user does not grossly misalign the gauge and thus get inaccurate readings, the face of the measuring block which engages the head is provided with a recess adjacent to the target zone. Thus the head can clearly be seen to contact a target zone when the head protrusion is being measured.

DETAILED DESCRIPTION OF THE DRAWINGS

DETAILED DESCRIPTION OF THE INVENTION

Figure 1:
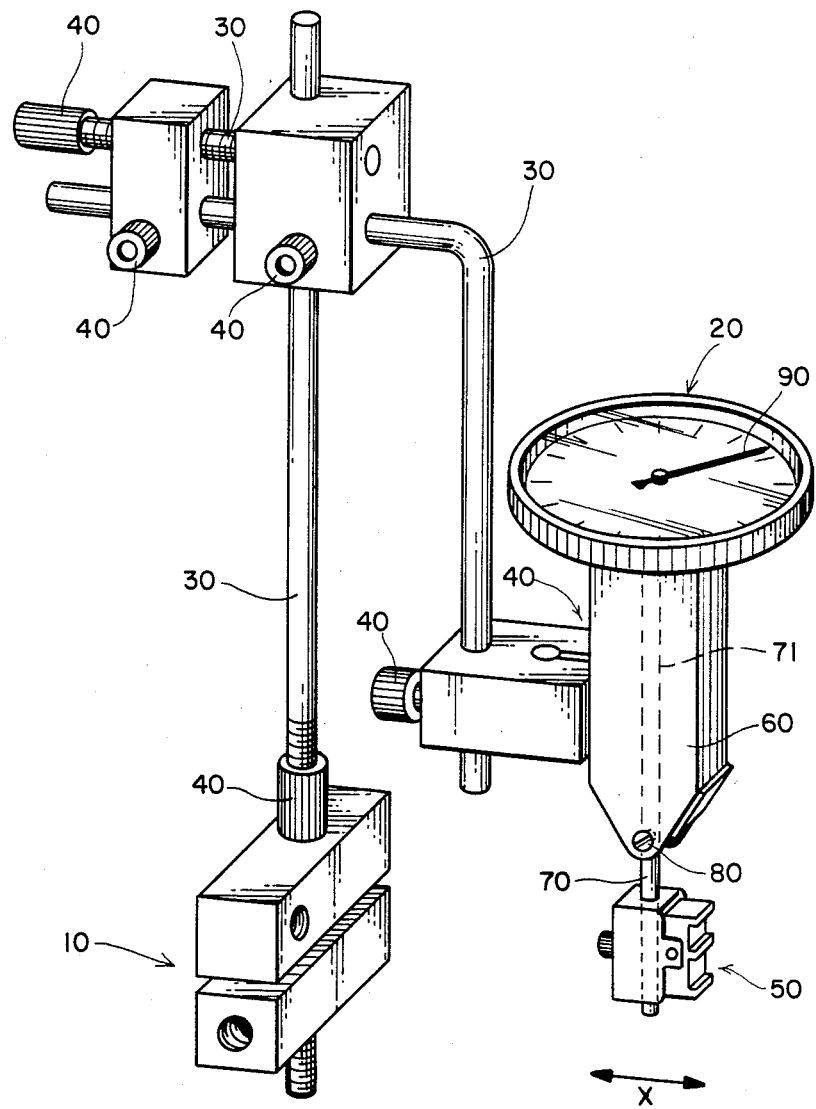
FIG. 1 shows an overall view of the preferred embodiment of a universal head protrusion gauge according to the present invention.

In accordance with a first embodiment of the invention, FIG. 1 shows an overall view of the universal gauge for measuring head protrusion. A universal mounting block 10 is provided so that the gauge can be anchored in a stable position on any convenient surface of the video recorder. A dial indicator 20 is coupled to the universal mounting block 10 by means of a series of shafts 30 and shaft locks 40 that permit the stable positioning of the dial indicator 20 in any desired position. A measuring probe 50 is coupled to the dial indicator by a indicator body 60, which houses a stem 71 which is free to pivot on a stem pivot 80. Motion of the measuring probe 50 in the X direction causes the stem 71 to rotate about stem pivot 80. This motion is then transferred to a feeler arm (not shown) which is part of the dial indicator 20 which in turn displays the motion in the X direction as a rotation of a pointer 90. The dial indicator 20 may be a conventional indicator available for example from Browne and Sharp Co. of North Kingston, R.I., which contains a fine spring (not shown) to provide a restoring force on stem 71. As will be explained shortly, this restoring force is applied to the video head itself via the measuring probe 50 so it is important that the restoring force be kept as light as practical, typically on the order of 15 grams.

Figure 2:
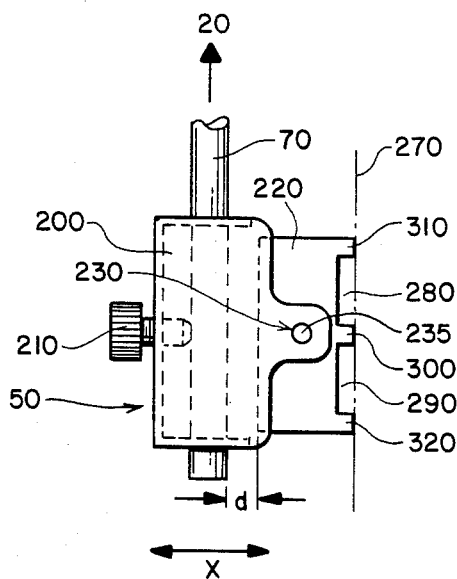
FIG. 2 shows details of a measuring probe as used in FIG. 1.

As shown in FIG. 2 the measuring probe 50 consists of a shoe 200 rigidly mounted to a measuring stem 70 by a locking screw 210. Typically, measuring stem 70 is a separate piece which acts as an extension of stem 71 and attaches to the bottom thereof. The shoe 200 houses a leveling block 220 which is free to rotate about a second pivot 230 with a limited range of motion d. The axis of rotation of the second pivot 230 is parallel to the axis of rotation of the stem pivot 80.

Figure 3:
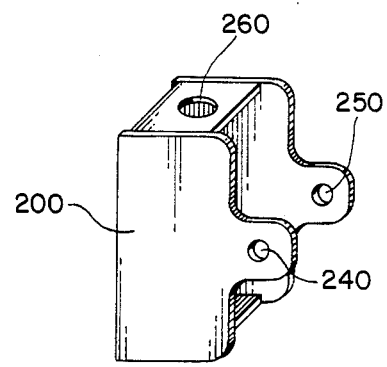
FIG. 3 shows details of a shoe as used in FIG. 2.

A perspective view of the shoe 200 is shown in FIG. 3. The shoe 200 has two holes 240 and 250 which act as a retainer for the pivot 230. The two holes 240 and 250 are chosen to have a center line perpendicular to a third hole 260 through which the measuring stem 70 passes. A pivot pin 235 is pressed into holes 240 and 250 and thus the leveling block 220 is free to rotate on the pivot pin 235.

The leveling block 220 itself consists of a flat front face 270 into which are cut two recesses 280 and 290. The recesses 280 and 290 thus create three pads in the flat front face 270; a target pad 300, and two leveling pads 310 and 320, all symmetrically positioned about the axis of rotation of the second pivot 230.

Figure 4:
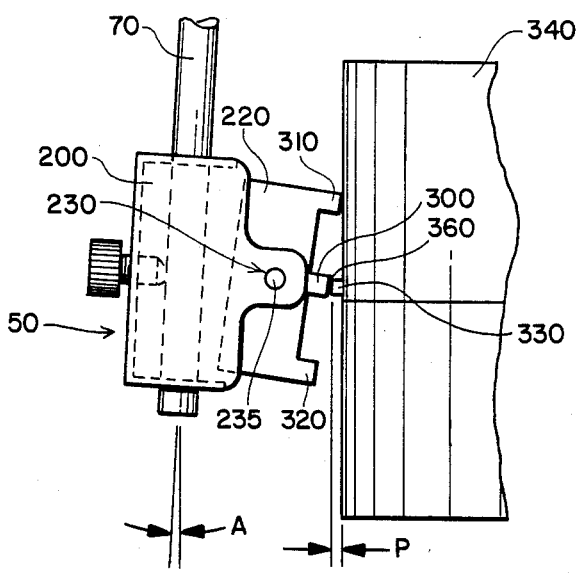
FIG. 4 shows a side view of the use of the measuring probe according to FIG. 2.
Figure 5:
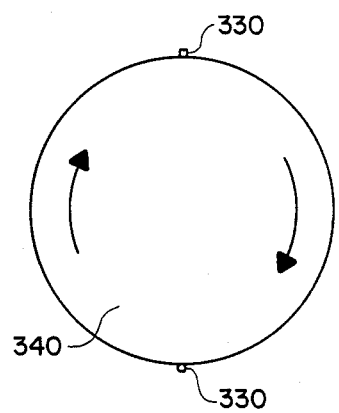
FIG. 5 shows a top view of a typical video recorder drum.

FIG. 4 illustrates the method used for measuring the head protrusion. First the gauge is mounted to a stable member of the video recorder by use of the universal mounting block 10. The measuring probe 50 then is positioned by manipulating shafts 30 and shaft locks 40 using a coarse adjustment to bring the probe to within about one-eighth of an inch (⅛") of the location of a head 330. Fine adjustments are then made to position the probe to within about 20 to 30 thousandths of an inch of the head location. The target pad 300 is then moved up or down as necessary to align it with the vertical position of the head (i.e. in the Y-direction). The drum 340 is then rotated as shown in FIG. 5 so that the probe 50 can be placed against a portion of the drum 340 in which there are no heads. While the probe 50 is in this position, all three pads 300, 310, and 320 will be in contact with the drum 340 and the measuring stem will move in the X direction an amount indicated by the pointer 90 to establish a base position representing no protrusion of the heads from the drum 340, and to establish a pre-load force on the indicator spring.

The drum is then rotated around by hand until the tip of head 330 is brought into contact with the target pad 300, and when the center of the head is aligned with the pad, a maximum reading will be obtained. Note that even though the heads 330 are relatively strong in the X direction (i.e., the radial direction of the drum 340) they are nonetheless still quite delicate. Thus, it is important that the amount of force exerted on the heads 330 is minimized; in the present design only the return force of the dial indicator 20 is exerted on the head 330. Once the probe 50 comes into contact with protruding head 330, the leveling block at times will rotate about the second pivot 230 until one of the two leveling pads 310 and 320 comes to rest on the surface of the drum 340, as illustrated in FIG. 4. This rotation, however, does not appreciably affect the measurement of the protrusion of the head which is at the center of the probe 50. At the same time the entire probe 50 will have moved in the X direction a distance P equal to the protrusion of the head 330 from the drum 340. Consequently the measuring stem 70 will rotate about the stem pivot 80 through an angle A, transmitting the distance P to the dial indicator 20 to be read out either in micrometers or ten thousandths of an inch. At the maximum reading the pointer 90 will actually correspond to a distance of P plus the base indication, which can easily be converted to the protrusion distance P by subtracting the base indication.

The measurement of video head displacement involves a very small horizontal displacement of the head 330 which is transformed into rotation of the stem 70 to produce a readout on the gauge 20. In particular, as is shown in FIG. 4, the stem 70 rotates through an angle "A" in response to a displacement of the target pad 300 by an amount "P". However, since tan A=P/Y, where "Y" is the vertical distance from the stem pivot 80 to the point of contact of the head 330 with the target pad 300, any error in Y will produce a corresponding error in the readout. To minimize this source of error the width of the target pad 300 is limited to a "target zone" 360 of about 0.050 inch. This is accomplished by separating the target pad 300 from the leveling pads 310 and 320 by recesses 280 and 290. The recesses 280 and 290 which define the target pad 300 make it easier for the user to see when the target zone 360 is properly aligned with the head 330. In addition, the recesses 280 and 290 are preferably chosen to be deeper than the maximum protrusion P of a new head 330, (e.g., about 0.020 inch) so that the user is given a positive indication of misalignment, i.e., the dial indicator 20 will always show P=0 when the video head is not in contact with the target zone 360, an obviously "erroneous" result, indicating to the user that a misalignment has occurred.

Figure 6:
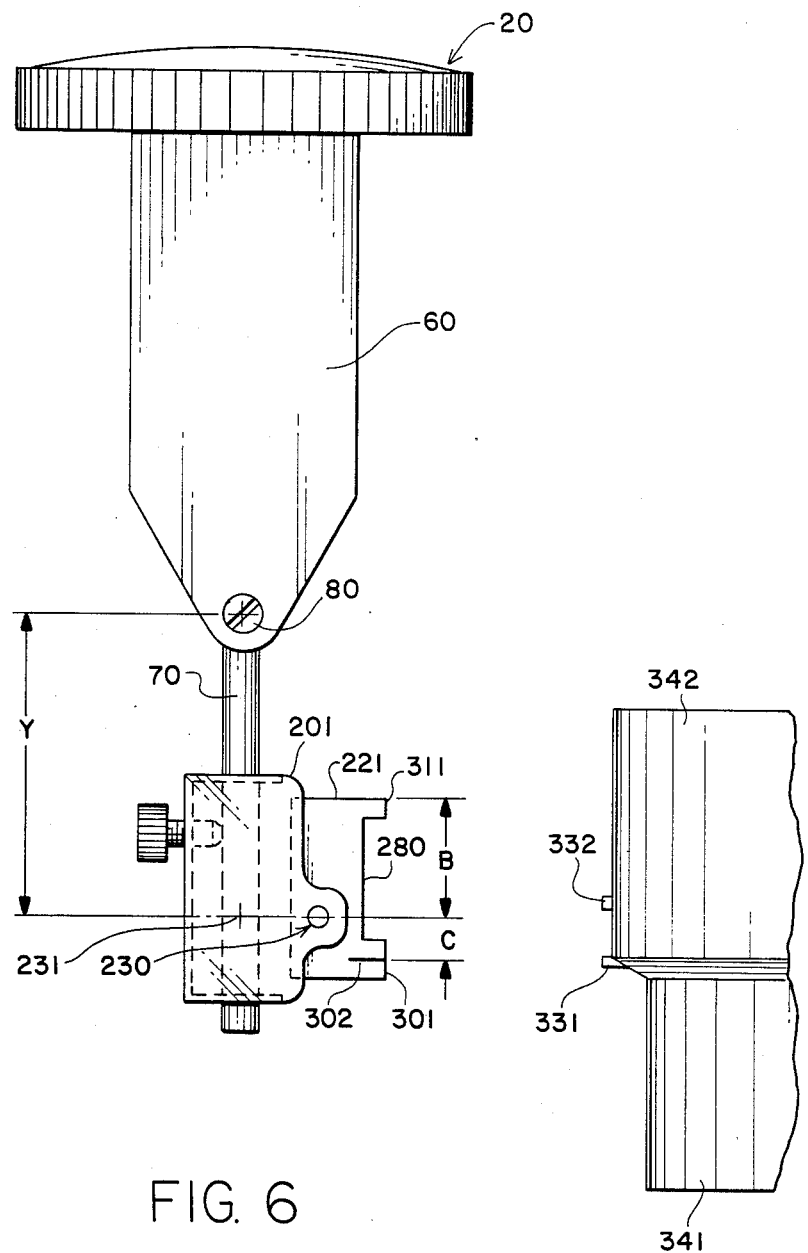
FIG. 6 shows a second embodiment of the invention.

In FIG. 6 is shown a second embodiment of the invention wherein the measuring probe includes a leveling block 221 having only two pads, a target pad 301 and a leveling pad 311. The same universal mounting block is used in this second embodiment as is used in the first embodiment. This second embodiment is particularly adapted to video recorders having an upper drum 342 and a lower drum 341 where the upper drum is slightly larger than the lower one, although the design will also work for video recorders having equal drum size. On these drums it is typical to provide pairs of heads, such as head 331 and 332, one above the other.

Measurements with this second embodiment are performed in a manner similar to those in the first embodiment, i.e. the probe is first placed against drum 342 and base dimension determined, then the drum is rotated and target pad 301 is brought against one of the heads with the corner of leveling pad 311 in contact with the drum. A recess 280 provided in leveling block 221, between leveling pad 311 and target pad 301, provides clearance for head 332 while making measurements of the protrusion of head 331. Also a line 302 is scribed on the target pad to aid in proper alignment with the head.

Figure 7:
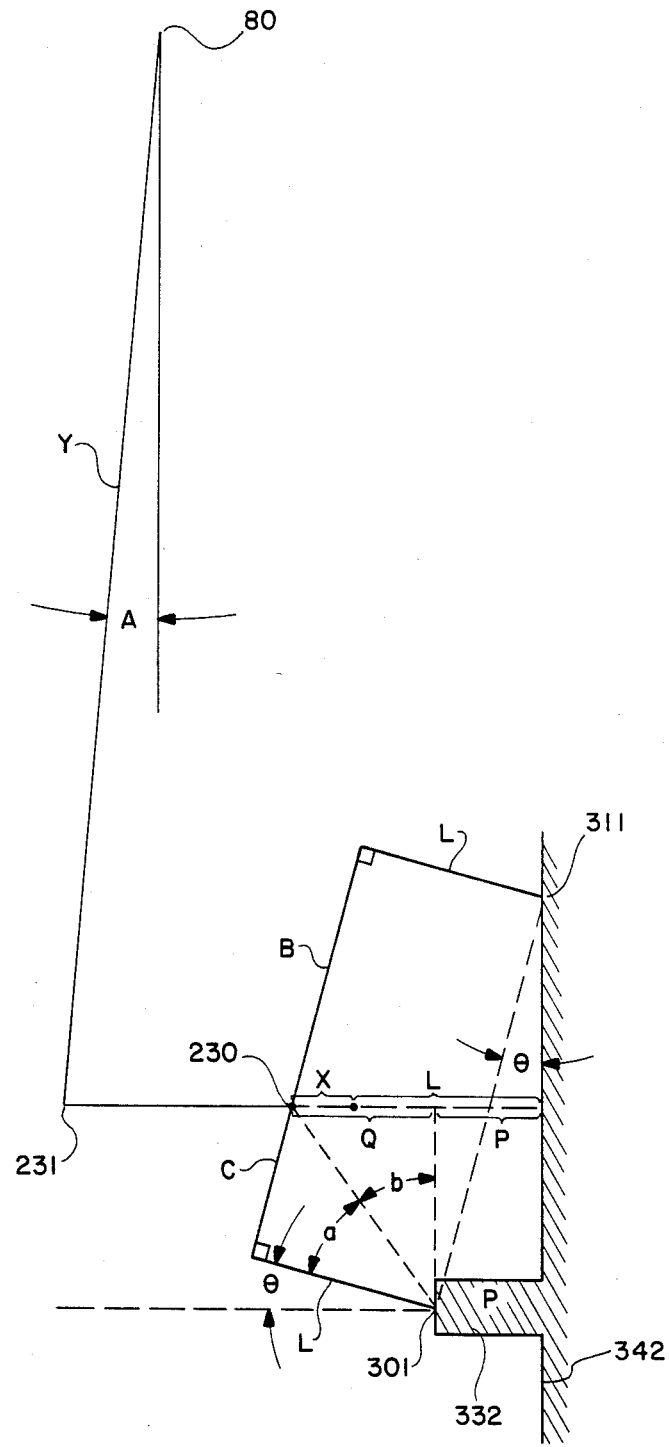
FIG. 7 shows a schematic representation of the second embodiment illustrating various lengths involved in the apparatus.

Shown in FIG. 7 is a schematic representation of the measuring scheme illustrating the relationship of the various dimensions involved. Here, "L" represents the length of the horizontal arms of the leveling block relative to pivot 230, "B" represents the vertical dimension from the pivot 230 to the horizontal arm corresponding to the leveling pad 311, and "C" represents the vertical dimension from pivot 230 to the horizontal arm corresponding to the target pad 301. In FIG. 7, the apparatus is shown as it would be configured for making measurements of the protrusion of head 332. The head is shown protruding a distance P, which corresponds to a rotation of the leveling block through an angle $\theta$, and displacement by a distance X. The total distance between the drum and pivot 230 is then (X+L). At the same time this must be equal to the distance P plus some incremental distance Q, which corresponds to the distance that pivot 230 is from the end of head 332, i.e.

$$X+L=P+Q. \tag{1}$$

From simple trigonometry it can be shown that $$Q=(C^2+L^2)^{\frac{1}{2}} \cos(a+\theta)$$

$Q=(C^2+L^2)^{\frac{1}{2}}(\cos a \cos \theta - \sin a \sin \theta)$. Substituting this into equation (1) yields:

$$X+L=(C^2+L^2)^{\frac{1}{2}}(\cos a \cos \theta - \sin a \sin \theta)+P. \quad (2)$$

Since $$\cos a = \frac{L}{(C^2+L^2)^{\frac{1}{2}}}, \sin a = \frac{C}{(C^2+L^2)^{\frac{1}{2}}},$$

$$\sin \theta = \frac{P}{C+B}, \text{ and } \cos \theta = \frac{[(C+B)^2 - P^2]^{\frac{1}{2}}}{C+B}$$

equation (2) simplifies to the following expression:

$$X+L = \frac{L}{C+B}[(C+B)^2 - P^2]^{\frac{1}{2}} + \frac{L}{C+B} \cdot P,$$

which is simply a quadratic in P and is easily solved in terms of the distances X, L, C, and B using the quadratic formula. In the special case of interest here, P is typically much smaller than (C+B), or L. This results in a significant simplification to equation (3) as follows:

$$P \doteq X\left(1 + \frac{C}{B}\right) \quad (4)$$

which is independent of L. From the previous analysis regarding the first embodiment, the displacement X corresponds to a rotation of stem 70 through angle A, so that X≐Y tan A for small angles A, where Y is the length of stem 70 from pivot 80 to point 231 (See FIG. 7). Equation 4 can then be rewritten as $$P \doteq Y(1+C/B) \tan A. \quad (5)$$

From equation 5 it is apparent that once angle A is determined, the head protrusion is a simple function of the length Y of the stem 70 and the lengths B and C, simple enough in fact that indicator 20 can be calibrated to read head protrusion directly. The particular lengths for B, C, and Y can be chosen from a wide range depending on which aspect of the device it is desired to optimize. However, there are several key considerations which need to be addressed in this selection. First, an adequate distance C should be provided so that the spring return force of the indicator will be sufficient to hold both the target pad and the leveling pad in engagement against the drum. From a mechanical point of view, the force exerted on the target pad by the head causes a torque on the leveling block in one direction which is balanced by the torque caused by the force of the drum on the leveling pad. Hence, the distances B and C determine the amount of force on each pad. Second, an appropriate ratio of C to B should be provided to ensure sufficient sensitivity for accurate indicator readings, since the higher the ratio of C to B, the less sensitive the indicator will be. Third, a low overall spring force is required to reduce the potential for damage to the fragile video heads. When using a standard 10th reading (i.e., 10,000th of an inch) dial indicator gauge, it has been found that the optimum geometry is as follows: Y=0.40 in., B=0.325 in., and C=0.14 in. It should also be noted that this second embodiment is implemented with separate scale divisions for head protrusion and eccentricity, since for measuring the eccentricity of the drums the displacement of stem 70 is determined simply by X=Y tan A, not by equation (5).

What is claimed is:

1. A gauge for measuring the protrusion of a head from a surface of a drum in a video recorder, comprising:
   a dial indicator for indicating the amount of protrusion of said head;
   a measuring stem cooperating with said dial indicator and rotatably mounted relative to the dial indicator on a first pivot;
   a cap mounted rigidly to the measuring stem; and
   a leveling block freely mounted relative to the cap on a second pivot, said leveling block having a substantially flat face adapted for engagement with the surface of said drum of the video recorder so that a dial indicator zero position can be determined, said leveling block comprising target zone means for ensuring that the head will contact the leveling block at a point within a known distance of the center of rotation of the second pivot to displace said leveling block at said point a distance equivalent to the protrusion of said head from said surface of said drum thereby rotating said measuring stem.

2. A gauge as in claim 1 wherein the target zone means comprises:
   a target pad located proximately to the center of rotation about the second pivot; and
   a leveling pad separated from the target pad by a recess in the substantially flat face, so that the head will contact the leveling block at said point within a known distance of the center of rotation of the second pivot.

3. A gauge as in claim 2 wherein the target pad is located in a horizontal plane through the center of rotation of the second pivot when the substantially flat face is oriented in a vertical direction.

4. A gauge as in claim 2 wherein the substantially flat face of the leveling block further comprises:
   first and second leveling pads separated from the target pad by first and second recesses in the substantially flat face, so that the head will contact the leveling block at said point within a known distance of the center of rotation of the second pivot, and the leveling block is free to rotate either clockwise or counter clockwise about the second pivot when the target pad is placed on the head to measure the protrusion of the head from the surface of the drum.

5. A gauge as in claim 4 further comprising a clamp coupled to the dial indicator, adapted for mounting in a fixed position relative to the drum of the video recorder.

6. A gauge as in claim 5 wherein the clamp comprises:
   plurality adjustment means for positioning the gauge in any desired position; and
   locking means coupled to the adjustment means for rigidly locking the adjustment means in place once the desired position is achieved.

7. A gauge as in claim 1 further comprising a clamp coupled to the dial indicator, adapted for mounting in a fixed position relative to the drum of the video recorder.

8. A gauge as in claim 7 wherein the clamp comprises:

plurality adjustment means for positioning the gauge in any desired position; and locking means coupled to the adjustment means for rigidly locking the adjustment means in place once the desired position is achieved.

9. A gauge as in claim 1 wherein the target zone means comprises:

a target pad located at said known distance from the center of rotation about the second pivot; and a leveling pad separated from the target pad by a recess in the substantially flat face, so that the head will contact the leveling block at said point within a known distance of the center of rotation of the second pivot.

10. A gauge as in claim 9 wherein the leveling pad is located on the substantially flat face in a direction opposite that of the target pad relative to the center of rotation of the second pivot.

11. A gauge as in claim 10 wherein the leveling block is free to rotate about the second pivot in a manner that permits the head to contact the target pad and the drum to contact the leveling pad when measuring the protrusion of the head from the surface of the drum.

12. A gauge as in claim 11 wherein the target pad is not located in a horizontal plane through the center of rotation of the second pivot when the substantially flat face is oriented in a vertical direction.

13. A gauge as in claim 9 wherein the leveling pad and the target pad are located relative to the center of rotation of the second pivot such that a force on the target pad from the head corresponds to a torque about that center of rotation in a first direction and a force on the leveling pad from the drum corresponds to a torque about that center of rotation which is opposite that of the first direction.

* * * * *